No. 709,778. Patented Sept. 23, 1902.
J. P. KETTERINGHAM.
CHECKREIN HOOK.
(Application filed Sept. 28, 1901.)
(No Model.)
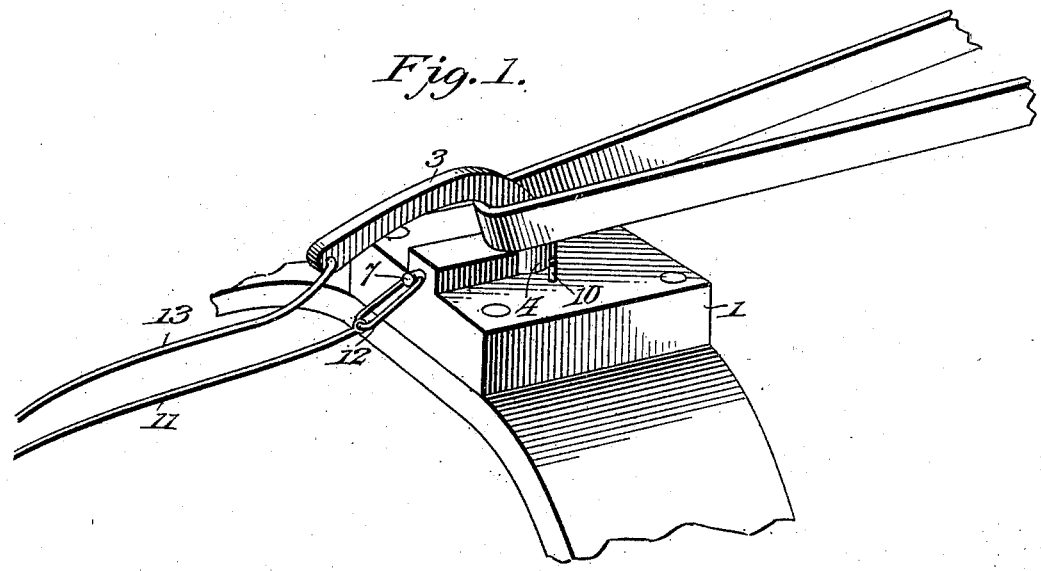
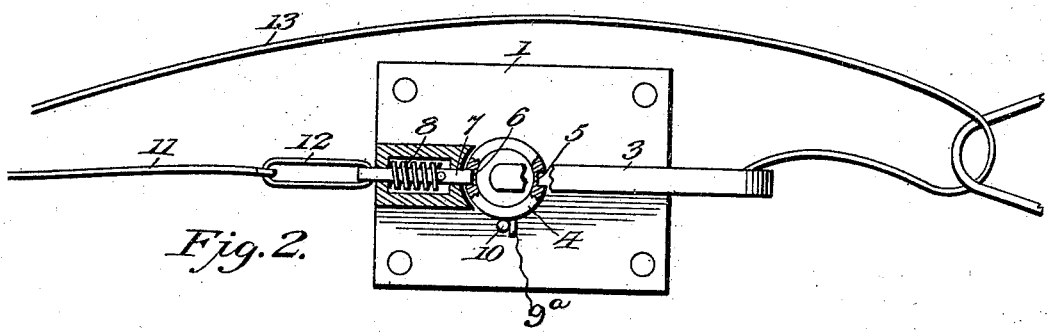
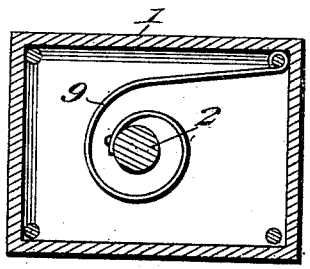
John P. Ketteringham, Inventor
Witnesses

UNITED STATES PATENT OFFICE.

JOHN PALMER KETTERINGHAM, OF PINERIDGE, MISSISSIPPI, ASSIGNOR OF ONE-HALF TO OLIVIA D. IRELAND, OF PINERIDGE, MISSISSIPPI.

CHECKREIN-HOOK.

SPECIFICATION forming part of Letters Patent No. 709,778, dated September 23, 1902.

Application filed September 28, 1901. Serial No. 76,935. (No model.)

*To all whom it may concern:*

Be it known that I, JOHN PALMER KETTERINGHAM, a citizen of the United States, residing at Pineridge, in the county of Adams and State of Mississippi, have invented new and useful Improvements in Checkrein-Hooks, of which the following is a specification.

This invention relates to checkrein-hooks, and has for its object to provide a hook which will effectually retain the checkrein in its adjusted position and which may be conveniently operated so as to release the checkrein without necessitating the occupant of the vehicle leaving his seat.

The peculiar construction embodied in this device will be clearly described hereinafter and illustrated in the accompanying drawings, in which—

Figure 1 is a perspective view of the invention, showing the hook in its normal position. Fig. 2 is a plan view illustrating the checkrein released, and Fig. 3 is a horizontal sectional view of the device.

The reference-numeral 1 designates a casing adapted to be secured to the harness-saddle in any convenient manner, and revolubly secured in the center of said casing is a vertically-arranged spindle 2, terminating in a hooked extension 3. At the juncture of the hook with the spindle is arranged an enlarged head 4, having two diametrically oppositely located recesses 5 and 6, which are adapted to be alternately engaged by a spring-pressed pawl or dog 7, sliding in a suitable guide-block 8. A coil-spring 9 surrounds the spindle 2 and has one end secured thereto and the other end secured to the inner wall of the casing 1. The spring is arranged so as to rotate the spindle and incidentally swing the hooked end in opposite direction to its normal position. The limit of movement of the spindle is controlled by a laterally-projecting pin 9ª, extending from the head 4, and which is adapted to strike against a vertical projection or pin 10, secured to the top of the casing adjacent the head. The normal position of the hook is shown in Fig. 1, in which the hook points rearward in the ordinary manner. The checkrein may be placed over the same and held to check the horse in the same manner as if an ordinary check-hook were employed. In order to retain the hook in its normal position, the sliding pawl engages the recesses 5 to hold this spindle in a locked position. If it is desired, however, to water the horse at one of the public watering-troughs or to uncheck it in ascending or descending a hill of steep grade, the driver may pull upon a flexible connection 11, which is secured to the pawl by a link 12, and thus release the spindle, so that the spring will swing the hook in a diametrically opposite direction, permitting the checkrein to slip off thereof. In this position the sliding pawl will engage the opposite recess and lock the spindle and hook in its abnormal position until such time as the pawl is released to permit the hook to be swung around in its normal position. A flexible connection 13 is secured to the free end of the hook and also extends back to a point adjacent the dashboard of the vehicle, so that when it is desired to recheck the horse the pawl may be drawn out of engagement with the recesses 6, and by pulling on the flexible connection 13 the hook may be drawn around to its normal position, as heretofore described. As the flexible connection 13 will pass through the checkrein, the said rein will be guided onto the hook as it is drawn around, and the horse will be checked up in the usual manner without the necessity of the occupant of the vehicle leaving his seat.

It will therefore be seen that the device is cheap, durable, and efficient in construction and well adapted to accomplish the work for which it is intended.

Having thus fully described my invention, what I claim, and desire to secure by Letters Patent, is—

1. In a checking and unchecking device, the combination with a laterally-swinging spring-actuated rotatable hook, a spindle on which said hook is mounted and formed with oppositely-disposed recesses, spring-actuated means for alternately engaging the recesses in the spindle to lock the hook in its determined position, and means for releasing the same.

2. In a checking and unchecking device, the combination with a casing provided with a projection near the center thereof, a spring-actuated rotatable hook carried by the casing, means for locking said hook in its normal position to hold the checkrein, means for releasing the hook, and means carried by the hook to engage the projection on the casing whereby the rotation of the hook will be limited.

3. In a checking and unchecking device, the combination with a casing adapted to be secured to the harness-saddle, of a spindle carried thereby, a spring within the casing and connected to the spindle for rotating the same, a hook carried by the spindle, diametrically oppositely located recesses in the spindle, a flexible connection secured to the hook, a spring-actuated pawl adapted to engage the recesses, and a connection for actuating the pawl.

4. In a checking and unchecking device, the combination with a casing, a spring-actuated rotatable hook carried thereby and adapted to swing in a lateral plane, means for locking the said hook to hold the checkrein, means for releasing the checkrein, and means for holding the hook rigid with relation to the casing and in a locked position when the checkrein is released.

5. In a checking and unchecking device, the combination with a casing, a spring-actuated rotatable spindle mounted therein and provided with oppositely-disposed recesses, a hook carried at one end of the spindle and adapted to swing in a lateral plane, a spring-pressed pawl for engaging the recesses to lock the hook, a pin arranged on the casing and adjacent the spindle and a laterally-projecting pin on the spindle adapted to abut against the first-named pin to limit the movement of said spindle.

In testimony whereof I affix my signature in presence of two witnesses.

JOHN PALMER KETTERINGHAM.

Witnesses:
JAMES O'CAVANUGH,
S. DUNCAN BAKER.